United States Patent
Toomey et al.

(10) Patent No.: US 8,429,149 B2
(45) Date of Patent: Apr. 23, 2013

(54) **SYSTEM, METHOD AND COMPUTER PROGRAM PRODUCTS FOR DETERMINING O*NET CODES FROM JOB DESCRIPTIONS**

(75) Inventors: Paul Toomey, Palm Harbor, FL (US); Sean Read, Odessa, FL (US)

(73) Assignee: Geographic Solutions, Inc., Palm Harbor, FL (US)

( * ) Notice: Subject to any disclaimer, the term of this patent is extended or adjusted under 35 U.S.C. 154(b) by 218 days.

(21) Appl. No.: 11/472,784

(22) Filed: Jun. 22, 2006

(65) Prior Publication Data

US 2007/0299818 A1    Dec. 27, 2007

(51) Int. Cl.
*G06F 17/30*    (2006.01)

(52) U.S. Cl.
USPC .......................................... 707/710

(58) Field of Classification Search .................. None
See application file for complete search history.

(56) References Cited

U.S. PATENT DOCUMENTS

| | | | |
|---|---|---|---|
| 7,369,556 B1 * | 5/2008 | Rekhter et al. | 370/392 |
| 2002/0133369 A1 | 9/2002 | Johnson | |
| 2003/0014294 A1 | 1/2003 | Yoneyama et al. | |
| 2003/0046311 A1 * | 3/2003 | Baidya et al. | 707/200 |
| 2003/0187680 A1 | 10/2003 | Fujino et al. | |
| 2004/0163040 A1 | 8/2004 | Hansen | |
| 2005/0050440 A1 | 3/2005 | Meteyer et al. | |
| 2006/0041532 A1 * | 2/2006 | Nikolov | 707/3 |
| 2006/0206448 A1 * | 9/2006 | Hyder et al. | 707/1 |
| 2007/0118514 A1 * | 5/2007 | Mariappan | 707/3 |

OTHER PUBLICATIONS

Mannetje and Kromhout, ("The use of occupation and industry classifications in general population studies"), International Journal of Epidemiology 2003;32:419-428.*

* cited by examiner

*Primary Examiner* — Bai D. Vu
(74) *Attorney, Agent, or Firm* — Harvey S. Kauget; Phelps Dunbar LLP

(57) ABSTRACT

Systems, methods and computer program products include job bots that are configured to periodically visit network sites that have stored therein one or more job postings. During each visit, the one or more job postings are analyzed and a searchable job post database is updated to add new job postings, modify changed job postings and delete any removed job postings. A search engine is provided for job seekers to search the searchable job post database where a consolidate list of job postings from the network sites is stored.

31 Claims, 14 Drawing Sheets

SYSTEM, METHOD AND COMPUTER PROGRAM PRODUCTS FOR DETERMINING O*NET CODES FROM JOB DESCRIPTIONS

BACKGROUND OF THE INVENTION

1. Field of the Invention

This invention relates to the field of job classification and more particularly to a system, method and apparatus for classifying job postings on a wide area network by generating an ONET code from an online job posting.

2. Description of the Related Art

Finding a job has progressed from word-of-mouth to newspaper want-ads to modern online services. The likes of Hotjobs.com and CareerBuilder.com have web sites containing millions of job postings. Furthermore, profession-specific sites such as careers.findlaw.com, jtpos.com have many more job postings specific to a particular industry or profession such as law. Even more geographically restricted sites such as orlandosentinel.com, Miami.com and latimes.com have job postings restricted to a certain geographic area (Orlando or Miami, Fla. and Los Angeles, Calif.). Add to that a plethora of corporate web sites such as att.com/hr (AT&T), dell.jobs.com (Dell) and 3m.com/careers (3M).

Each web site has its own database of job postings, its own search engine to help the jobseeker find the job they are looking for, its own format for displaying results and its own method/format for importing a resume from the jobseeker. Furthermore, many of these web sites require the jobseeker have an account along with a username and password. In general, tens-of-thousands of new jobs are added, expired or modified every week; requiring the jobseeker to periodically log onto all potential job posting web site (remembering their logon credentials) and searching for their desired job using the tools specific to that web site.

Adding to the difficulty in finding a job is the variability of job titles, making it difficult to exhaustively find all jobs that a job seeker is qualified to perform. For example, if a computer consultant is trying to find a job and uses the keyword, "consultant," they may find many extraneous jobs for "tax consultant," "financial consultant," etc. If an engineering associate looks for "engineering associate" or "associate," they may find extraneous jobs for "sales associate," "checkout associate," etc.

Fortunately, the National O*NET® Consortium was organized to accomplish the development of O*NET® for the US Department of Labor, Employment and Training Administration (ETA). Job Seekers can use a set of O*NET® codes to hone their job search to a focused group of job openings. Previously, the job seeker would select a very broad category such as "Accounting" or "Legal," whereas the selection of a more specific O*NET code such as 43-3011.0 for "Bill and Account Collectors" or 13-2031.00 for "Budget Analyst" would hone their search to a set of more relevant open positions. More information regarding O*NET® codes is available from the National O*NET Consortium on the world-wide-web at http://www.onetcenter.org, of which O*NET® is a registered trademark.

Knowing a proper O*NET® code, a job seeker can hone the list of available positions down from thousands of often irrelevant openings down to a handful of focused openings. Unfortunately, many job postings are not coded with an O*NET® code, making it difficult for search software to use the O*NET® hierarchy of codes to narrow the job search.

What is needed is a system that will examine the various fields of a job posting and determine a proper O*NET® to assign to the job posting for later search and retrieval.

SUMMARY OF THE INVENTION

The present invention includes a unique method of examining various fields of a typical job posting and from the data in these fields and determining a specific O*NET® code to assign to the job posting. The present invention is particularly useful as employed in a system that visits network (World Wide Web) sites (hosting sites) having active job posts, extracting job posts from that network site and storing the job posts in a searchable job postings database. By assigning a specific O*NET® code to each job post as it is captured, the job seeker can search the searchable database to find job postings most relevant to their needs.

In one embodiment, a method for determining ONET codes is disclosed including inputting a job posting and extracting fields of the job posting, then looking up at least one of the fields in tables that include translations to an ONET code. If an entry is found in the tables, an associated ONET code from the tables and the job posting is stored in a searchable job posting database.

In another embodiment, a system for determining ONET codes is disclosed including a computer connected to a network with a storage device operationally adapted to the computer that has a searchable job posting database stored. A plurality of job bots operate on the computer, each of which is adapted to visit an assigned job post hosting site through the network and extract job post fields and store the job post fields and an ONET code in the searchable job posting database, the ONET code determined by the job bot by indexing at least one of the job post fields into lookup tables.

In another embodiment, a computer readable medium including computer programming instructions that cause a computer to perform the method for determining ONET codes is disclosed, the method comprising the steps of inputting a job posting and extracting fields of the job posting then looking up the fields in tables that include translations to an ONET code. If found, storing an associated ONET code from the tables along with the job posting in a searchable job posting database.

In another embodiment, a computer program product for use with a computer system for determining ONET codes is disclosed including a computer usable medium having computer-readable code means embodied in the medium, the computer-readable code having computer readable code for inputting a job posting and computer readable code for extracting fields of the job posting and computer readable code for looking up the fields in tables that include translations to an ONET code and if found, computer readable code for storing an associated ONET code from the tables and the job posting into a searchable job posting database.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
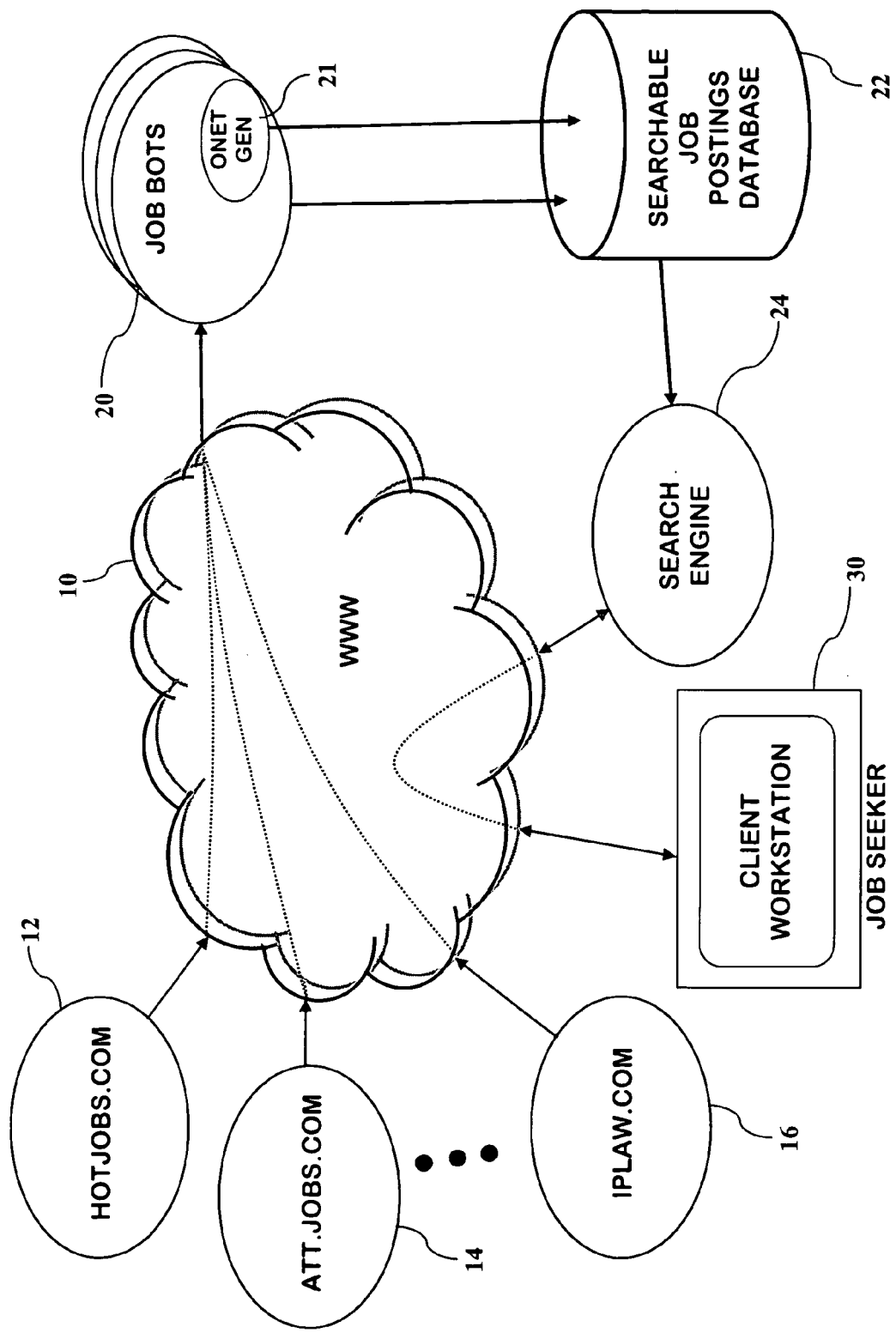
FIG. 1 illustrates an example system for spidering job postings and generating O*NET® codes according to one embodiment of the present invention.

Reference will now be made in detail to the presently preferred embodiments of the invention, examples of which are illustrated in the accompanying drawings. Throughout the following detailed description, the same reference numerals refer to the same elements in all figures. Throughout the description, the term job post or job posting refers to any type of electronic advertisement for an open position, e.g., a job. The term job post hosting site refers to any electronic site accessible by the system of the present invention and having at least one job post stored therein. The term searchable job posting database refers to a searchable database for storing job post information or data extracted from one or more job hosting sites. The searchable job posting database has a schema defining the structure and relationship of its contents, but the exact schema can vary without veering from the inventive parts of the present invention. Furthermore, the searchable job posting database can be managed by any database manager including, for example, Oracle and Microsoft® SQL Server, without veering from the inventive parts of the present invention. The term job spider refers to a program that automatically extracts data related to job postings from the job postings on job post hosting sites. The terms O*NET® or O*NET® code or ONET code refer to a numeric encoding of an occupational title. O*NET® stands for the Occupational Information Network as supported by the United States Department of Labor. Although the present invention deals preferably with O*NET® codes, it is anticipated that any other occupational code can be generated without veering from the scope and intent of the present invention. For that matter, any other job classification can be substituted for ONET codes in this specification, including the claims.

Referring now to FIG. 1, an exemplary system for spidering job postings that utilizes the present invention to associate proper O*NET® codes with a job post is shown. The present invention includes job bots 20 that periodically visit job post hosting sites 12/14/16 to extract job post information. The job hosting sites 12/14/16 are, for example, for-fee job posting web sites such as hotjobs.com 12; private corporate job posting web sites such as AT&T Corporations att.jobs.com 14 and specialized for-fee job posting web sites having a narrow set of types of jobs such as iplaw.com 16, having jobs related to the field of law. Other types of sites include the US and foreign governments and college web sites. The present invention is not limited to the type of hosting site. A list of the target sites is created by a person searching the network for job postings.

For each particular hosting site 12/14/16, there is a corresponding job bot 20 designed to find job postings, parse information from the job postings and store the parsed information in the searchable job postings database 22. For much of the information found on the job postings, the data is copied directly into a record of the searchable job posting database 22. For example, the schema of the searchable job postings database 22 has a field for contact last name and the hosting site also has a field for contact last name, then that field is copied directly into the searchable record for that job posting. Alternately, if the job posting has a field for contact name (last, first) and the searchable job postings database 22 has a field for contact last name, then the field is passed through a conversion that, in this example, copies all characters from the job post field for contact name up until the comma into the searchable job postings database 22 field for contact last name. The Searchable Job Post Fields in Table-1 below is an exemplary list of fields that are mined from the job posting into the searchable job postings database 22:

TABLE 1

Searchable Job Post Fields

| FIELD NAME | DESCRIPTION |
| --- | --- |
| Jobid | The job ID that is posted on the website. |
| JobWebsiteID | This is the job ID that the website. |
| jobtitle | The title of the job. |
| jobtype | Type of job. For example: full-time, part-time, and per-diem. |
| openings | Number of jobs of this type that are available. |
| postdate | The date the job was posted on the host site. |
| closedate | Last date to apply for the job. |
| startdate | When the job will be starting. |
| jobdesc | Description of the job. |
| education | Educational requirements of the job. |
| experience | The experience requirements of the job. |
| additionalinfo | Anything else that is relevant to the job that does not appear in another field. |
| shiftdesc | Information about the type of shift. |
| hours | Number of work hours per week. |
| benefits | Description of what benefits are included with the job and are specific for that job. |
| benefitsURL | A link to the benefits page, if one exists. |
| url | A link to the job details page. |
| applybyurl | A link to a page where the jobseeker can go to apply for the job. |
| salarystring | What the job pays, or a pay scale. |
| salary | The numerical amount of the pay. |
| maxsalary | The maximum salary that is available |
| salaryunit | Code used to describe pay frequency. |
| employer | The employer's name. |
| contact | The contact person or department. |
| phone | Phone number |
| fax | Fax number |
| email | Email address |
| address1 | The street address where the job is located. |
| city | The city where the job is located. |
| state | The state where the job is located. |
| country | The country where the job is located. |

In this exemplary use of the present invention, the O*NET® code generator 21 is invoked within the Job Bots 20 and analyzes the various fields of the spidered job post to generate an O*NET® code. The O*NET® code is stored as a searchable job post field. An exemplary method of examining job code fields and generating O*NET® codes is described in detail in this document. Being that job titles are an inexact science, some will be standard (e.g., tax preparer), some standard with misspelling (e.g., tax prepparer), some will have added text (e.g., Jr. tax preparer or tax preparer 13579), some will be cataloged by O*NET® as a Lay title (e.g., MSCE) and some will not be cataloged by O*NET® (e.g., web page developer). For these reasons, the job post is analyzed in steps, looking for the best match of an O*NET® code to the job title, company and job description.

Once searchable job posting records are available in the searchable job postings database 22, a job seeker at a client workstation 30 connects to the search engine 24 of the present invention through a network, for example the World Wide Web 10. Exemplary web page screens related to this search function will be described along with FIGS. 8-10. There, the job seeker can search for job postings from many different job post hosting sites 12/14/16 by searching the searchable job postings database 22. Once a job of interest is found (e.g., a record of the searchable job posting database 22 is identified), the job seeker can link back to the job hosting site 12/14/16 and apply for the job in the same manner as if they found the job on that particular job hosting site 12/14/16. Applying for the job can be done through the "url" field or the "applybyurl" field of the searchable job post fields within the record found. Alternately, the present invention can include tools allowing the job seeker to register their resume and when a job posting is found, export their resume back to the job post hosting web site 12/14/16 containing the identified job post.

Figure 2:
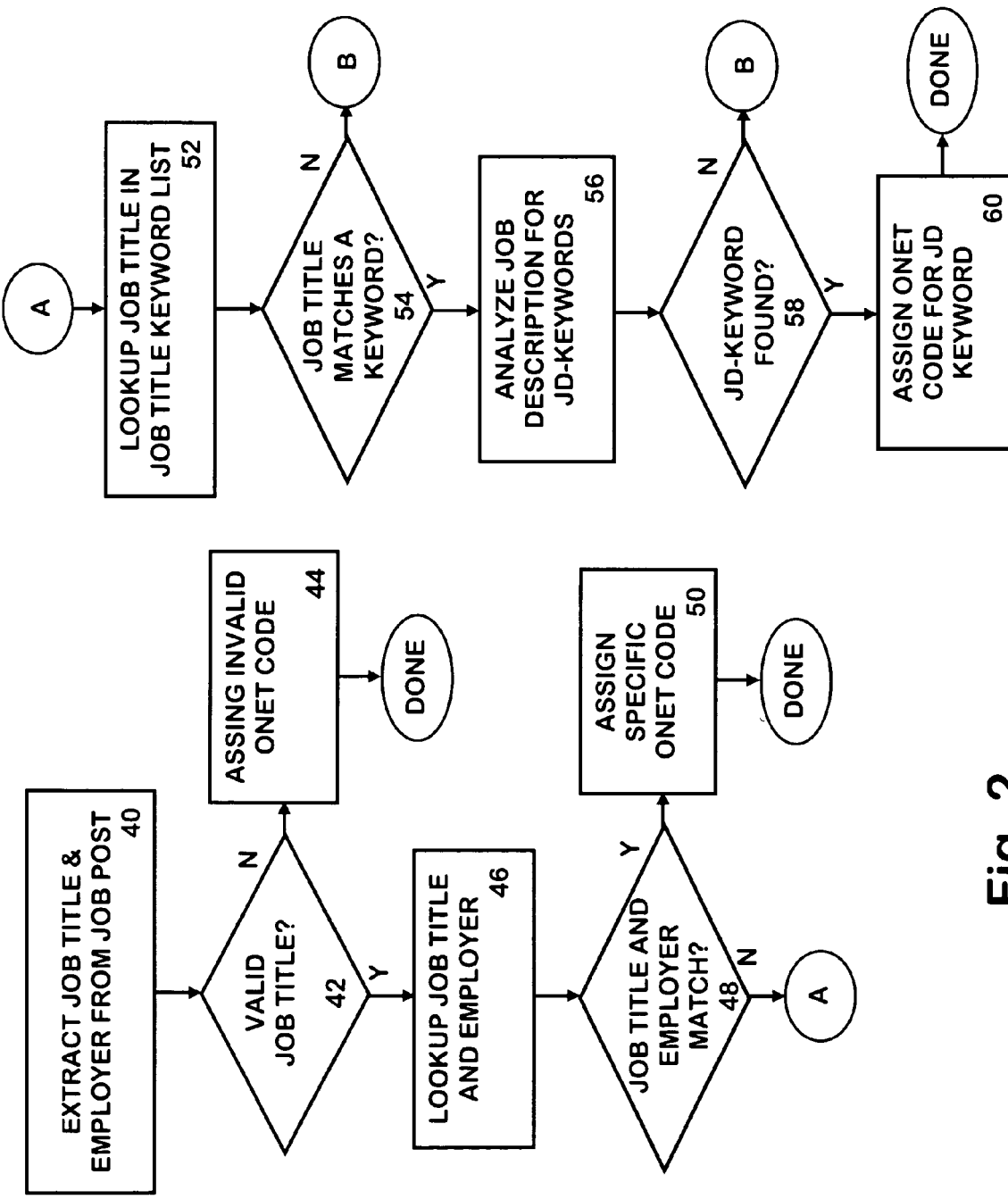
FIG. 2 illustrates an example method of extracting O*NET® codes from a job posting according to one embodiment of the present invention.

Referring now FIG. 2, an example method of extracting O*NET® codes from a job posting according to one embodiment of the present invention is shown. The first step is to extract the job title and employer name from the job post 40. The job title is looked up in a table of invalid job titles 42 and if found, an invalid O*NET® is assigned 44. The table of invalid job titles is similar to Table 2 below. As an example, if the job title is "investor" an invalid O*NET® code is assigned (e.g., all zeros).

TABLE 2

Invalid Job Titles
Job Title investor
freelancer
solicitor

If the job title isn't found in the invalid list, the job title and the employer is searched in a job title/employer table or database 46 (see example Table 3) and if the job title and employer is found, the associated O*NET® code is assigned 50.

TABLE 3

Exemplary Job Title/Employer to O*NET ® code

| Job Title | Employer | O*NET ® code |
|---|---|---|
| Associate | AT&T | 17-3023.03 |
| Associate | Century21 | 41-9022.00 |
| Tax Preparer | H&R Block | 13-2082.00 |

If the job title/employer isn't found, the job title is searched in a job title keyword table or database 52 (see example Table 4) and if the job title keyword is found 54, the job description is searched for keywords associated with the job title keyword 56 and, if one is found in the description 58, the associated O*NET® code is assigned 60. For example, if the job title is "Staff Collector" and the job description includes, " . . . delinquent car payments . . . ", then "collector" is found in the Job Title column of Table 4 and the keyword "delinquent" from the Job Description Keywords of Table 4 is found in the description, therefore, the O*NET® code of 43-3011.0 is assigned.

TABLE 4

Exemplary Job Title/Keyword Table

| Job Title | Job Description Keywords | Potential O*NET ® code |
|---|---|---|
| Collector | bill | 43-3011.0 |
| Collector | delinquent | 43-3011.0 |
| Analyst | budget | 13-2031.00 |
| Analyst | spending | 13-2031.00 |
| Preparer | tax return | 13-2082.00 |
| Food preparation | Food | 35-2021.00 |

Figure 3:
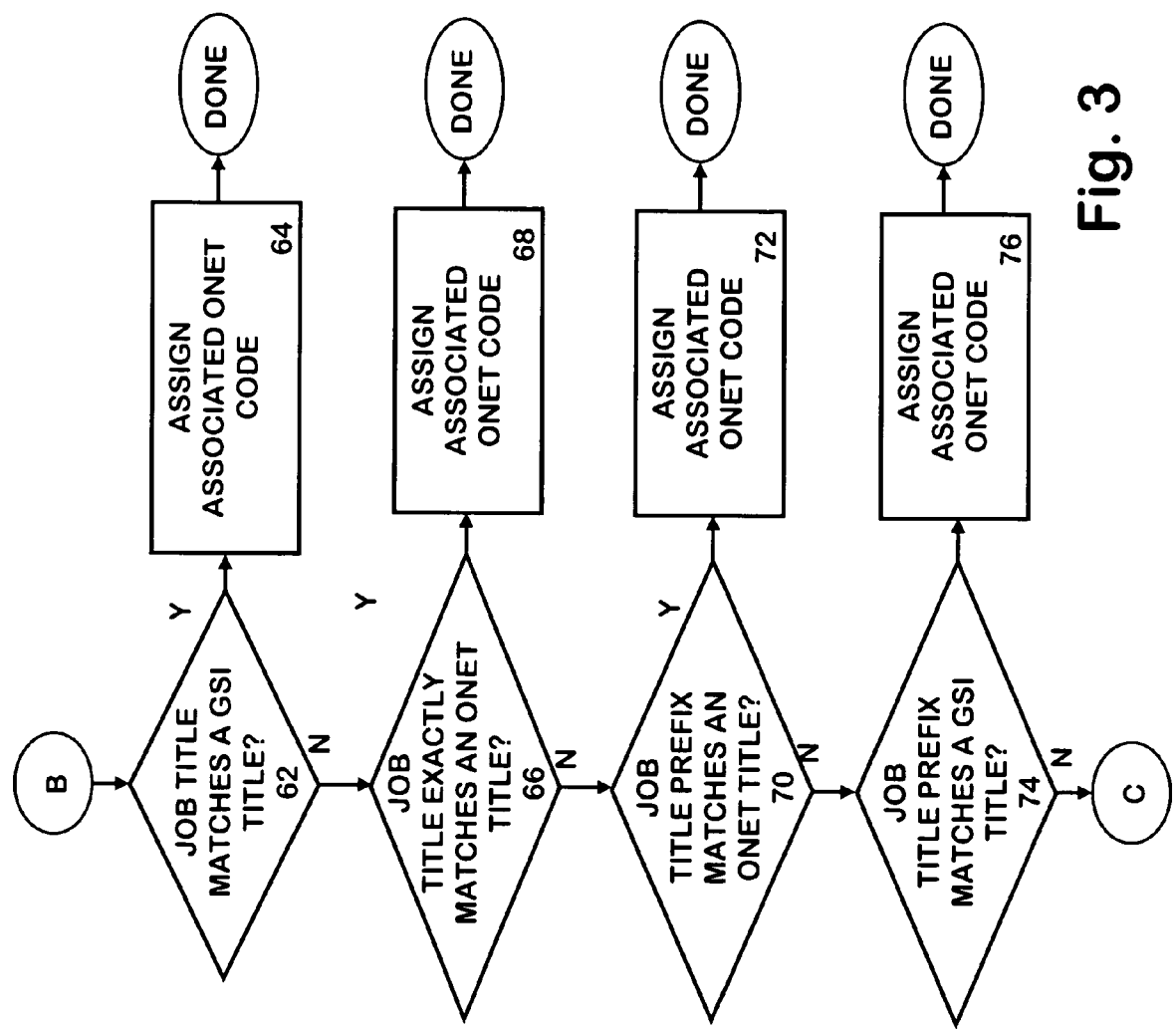
FIG. 3 illustrates a continuation of the example method of extracting O*NET® codes from a job posting according to one embodiment of the present invention.

Referring now FIG. 3, a continuation of the example method of extracting O*NET® codes from a job posting according to one embodiment of the present invention is shown. Next, the job title is looked up in a table of GSI job titles 62 (e.g., job titles that were created internally by some company, not by O*NET®) such as those in Table 5 [note: GSI in this example relates to a company name that created the job titles]. Some job titles come into being as abbreviations (e.g., MCSE for Microsoft Certified System Engineer) or are new (Web Page Developer) and are not directly mapped by O*NET®. If the job title is found, the associated O*NET® code is assigned 64.

TABLE 5

Exemplary GSI Job Title to O*NET ® code

| GSI Job Title | O*NET ® code |
|---|---|
| MCSE | 15-1032.00 |
| Web Page Developer | 15-1032.00 |
| Cobol Developer | 15-1032.00 |

If not found there, an exact match between the job title and an O*NET® job title is sought 66. If an exact match is found, the associated O*NET® code is assigned 68. An exemplary O*NET® job title to O*NET® code table is shown in Table 6.

If not found, a prefix match is performed comparing the job title to the O*NET® job titles 70 using a table as in Table-3. This is useful when the job title has extra words or numbers appended. For example, "Income Tax Preparer" would match the third entry of Table-3. If a prefix match is found, the associated O*NET® is assigned 72.

If not found, a prefix match is performed comparing the job title to the list of GSI job titles 74 using a table as in Table-5 above. If a prefix match is found, the associated O*NET® is assigned 76.

Figure 4:
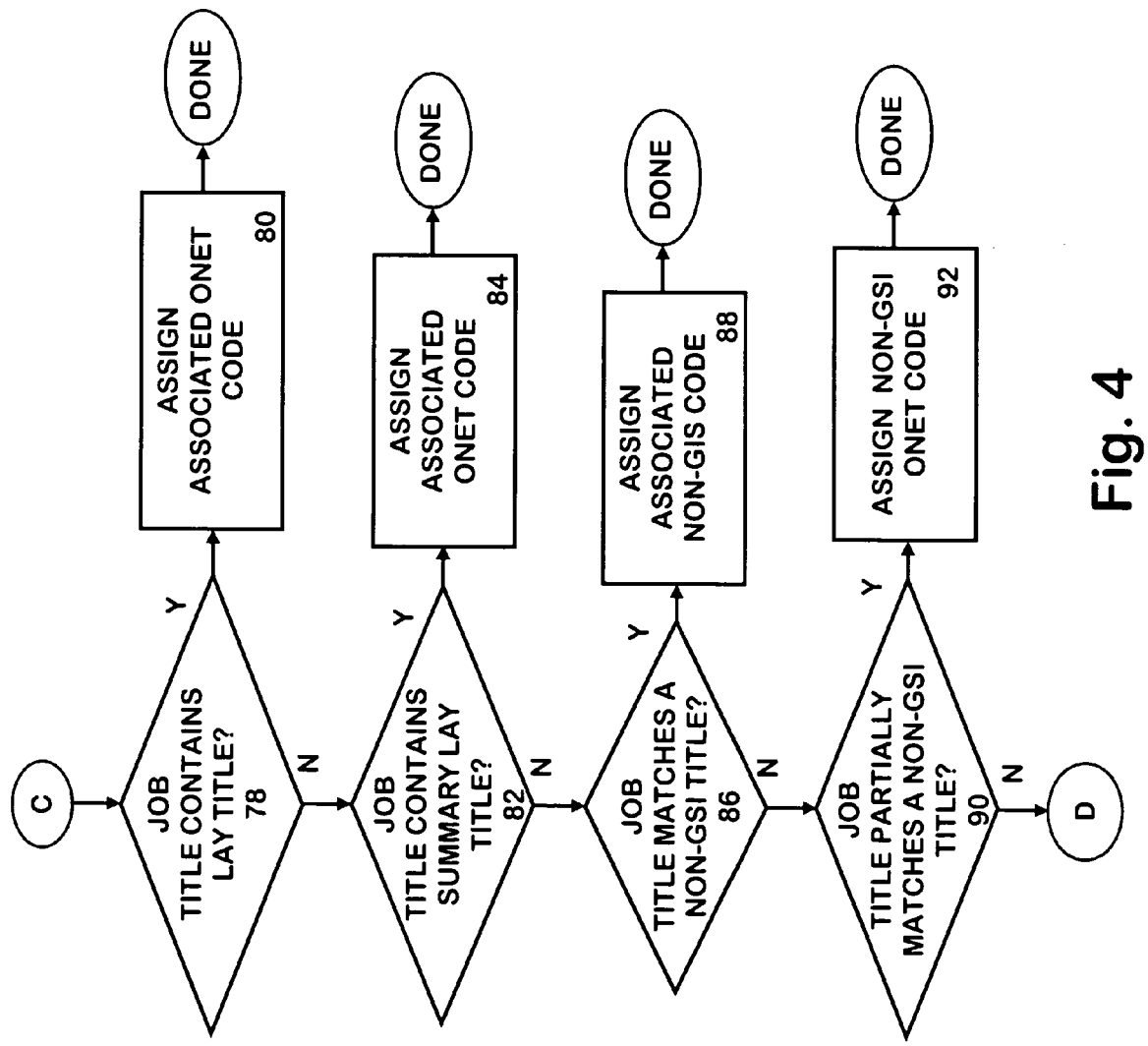
FIG. 4 illustrates a continuation of the example method of extracting O*NET® codes from a job posting according to one embodiment of the present invention.

Referring now FIG. 4, a continuation of the example method of extracting O*NET® codes from a job posting according to one embodiment of the present invention is shown. If not found, a search is performed to determine if the job title contains any of the lay titles 78 using a table as in Table-6. If a match is found, the associated O*NET® is assigned 80. Therefore, if the job title is "Senior Technical Manager," it will match the second line of Table-6.

TABLE 6

Exemplary Lay Job Title to O*NET ® code

| Lay Job Title | O*NET ® code |
|---|---|
| Technical Director | 27-2012.05 |
| Technical Manager | 13-2011.01 |

If not found, a search is performed to determine if the job title contains any of the summary lay titles 82 using a table as in Table-7. If a match is found, the associated O*NET® is assigned 84. For example, if the job title is "Software Manager, Oshkosh," it will match the second line of Table-7.

TABLE 7

Exemplary Summary Lay Job Title to O*NET ® code

| Lay Job Title | O*NET ® code |
|---|---|
| Director | 27-2012.05 |
| Manager | 13-2011.01 |

If not found, a search is performed to determine if the job title matches a non-GSI title 86 using a table as in Table-8. If a match is found, the associated O*NET® is assigned 88. For example, if the job title is "Software Manager, Oshkosh," it will match the second line of Table-8.

TABLE 8

Exemplary Non-GSI Job Title to O*NET ® code

| Non-GSI Job Title | O*NET ® code |
|---|---|
| choreographer | 27-2012.05 |
| plebologist | 13-2011.01 |

If not found, a search is performed to determine if the job title contains any of the non-GSI job titles 90 using a table as in Table-8. If a match is found, the associated O*NET® is assigned 92.

The above steps are an example of a method for determining an O*NET® code given a job description that has a job title and a company name. This is the preferred method of performing this task, but it is envisioned that countless other methods are possible including the addition or subtraction of steps and/or the analysis of additional fields, all of which are anticipated by and included in the present invention. For example, keywords from the job description text can be used to further hone a O*NET® code when two possible O*NET® codes are possible for a given job title.

Figure 5:
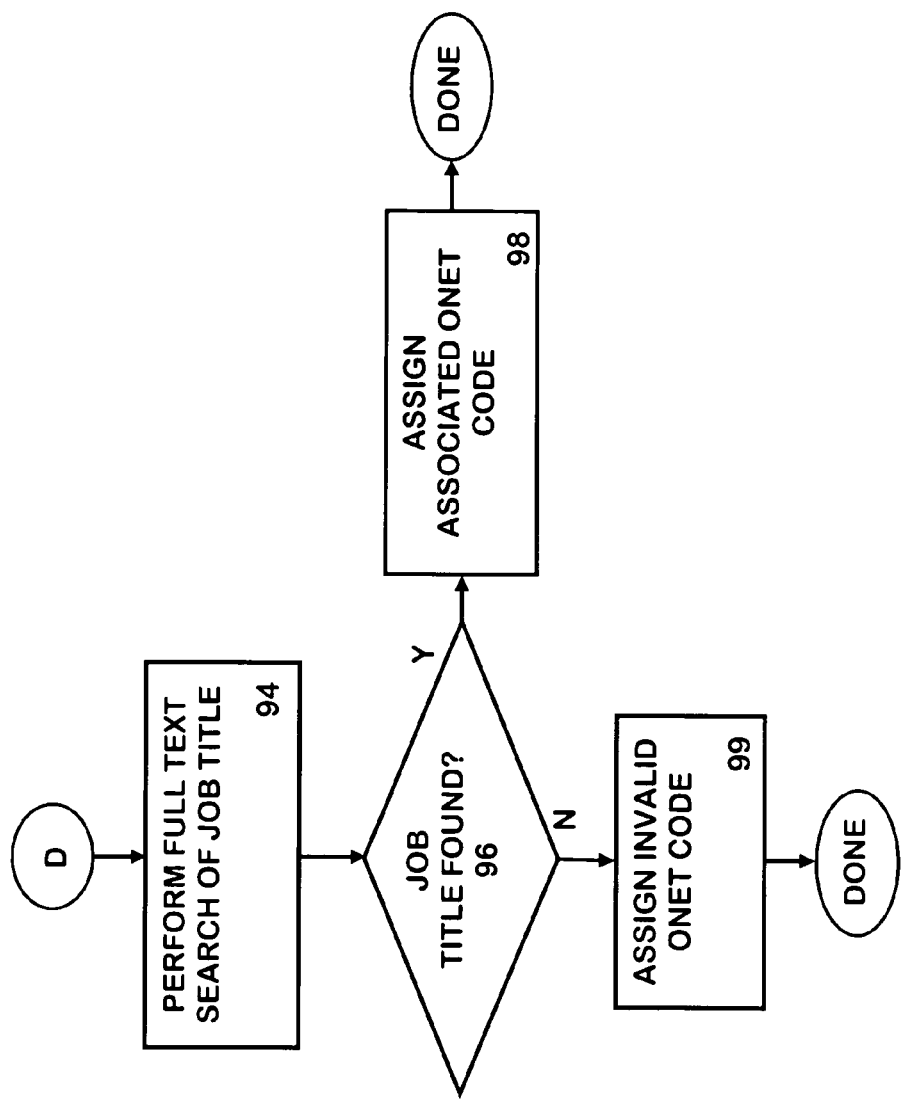
FIG. 5 illustrates a continuation of the example method of extracting O*NET® codes from a job posting according to one embodiment of the present invention.

Referring now FIG. 5, a continuation of the example method of extracting O*NET® codes from a job posting according to one embodiment of the present invention is shown. If all else fails, a full text relevance search of all possible job titles is performed on the job title from the job post 94. It is well known in the art how to perform a relevance search. Search engines such as Google® utilize such a search engine to find references that are as close to the search term as possible. O*NET® Online has a similar search engine for O*NET® codes, returning a list of the closest O*NET® occupations to the job title. This type of search engine compensates for misspelling (e.g., a job title of "directtor" finds "Directors—Stage, Motion Picture") or extraneous words (e.g., a job title of "Music Program Directors" finds "Music Director"). In the preferred embodiment, if at least one job title is found 96, the O*NET® code of the closest result of the relevance search is assigned to the job post 98 and if none are found, an invalid O*NET® code is assigned 99. In other embodiments, multiple O*NET® codes are assigned, for example, the first five most relevant O*NET® codes. In another embodiment, a minimum relevance quotient is required (step 96 is then "Job Title Found with Relevance Quotient Greater than 62%"). In another embodiment, several of the top most relevant job titles returned are compared looking for similarities. For example, if at least two job titles have the same O*NET® code.

Figure 6:
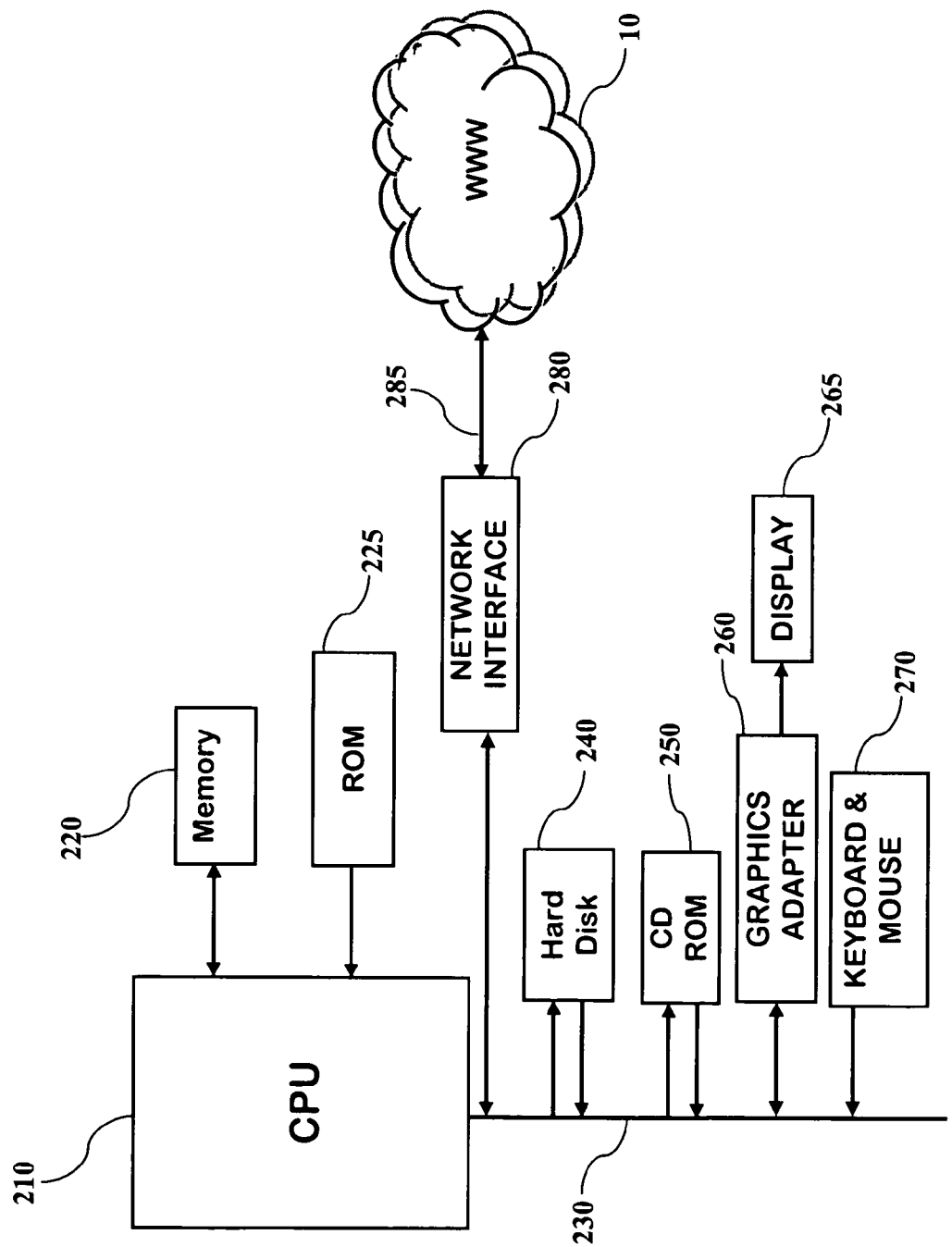
FIG. 6 illustrates an example computer system of all embodiments of the present invention.
Figure 6A:
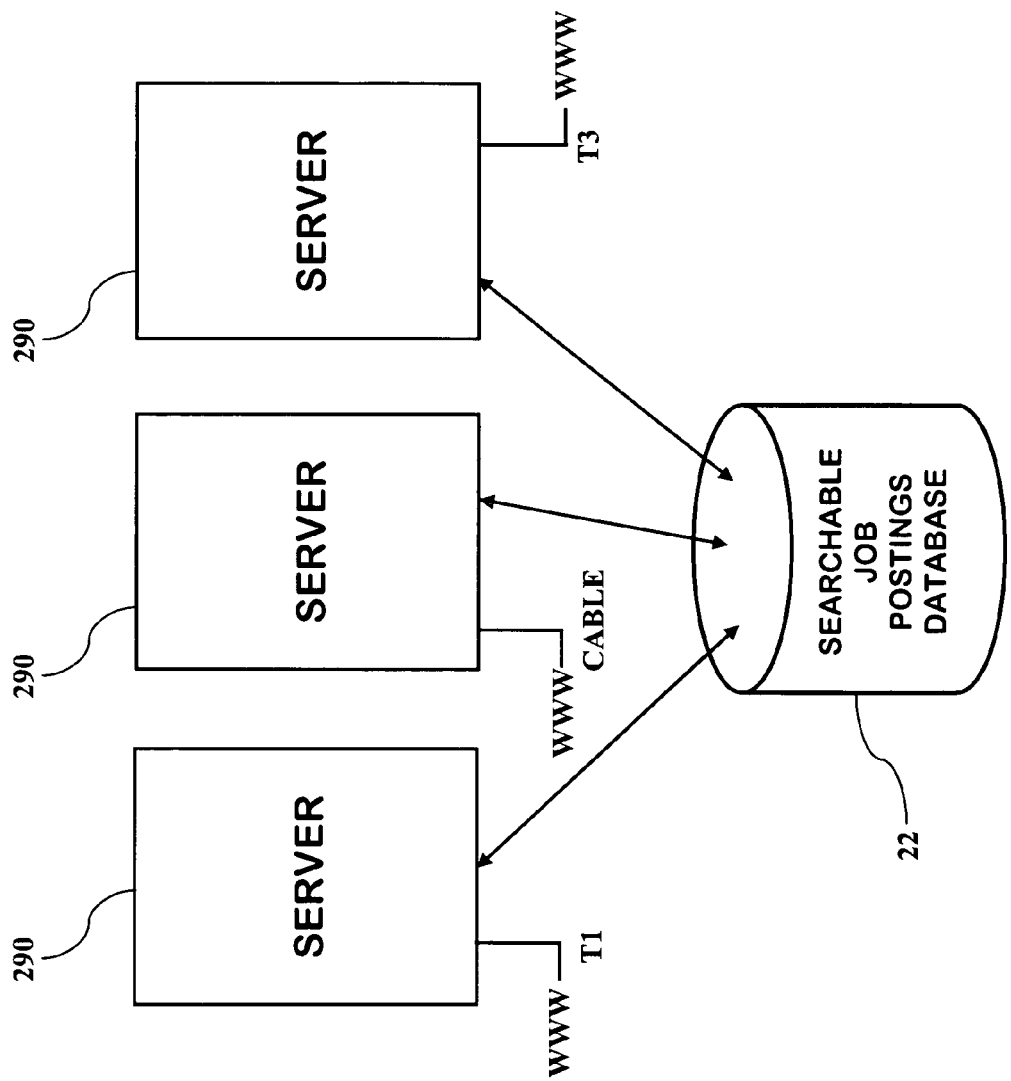
FIG. 6a illustrates a second example computer system of all embodiments of the present invention.

Referring to FIG. 6 and FIG. 6a, a schematic block diagram of an exemplary computer system of the present invention is shown. Although shown in its simplest form, having a single processor, many different computer architectures are known that accomplish similar results in a similar fashion and the present invention is not limited in any way to any particular computer system. The present invention works well utilizing a single processor system as shown in FIG. 5, a multiple processor system where multiple processors share resources such as memory and storage, a multiple server system (as in FIG. 6a) where several independent servers operate in parallel (perhaps having shared access to the searchable job posting database 22) or any combination. In this, a processor 210 is provided to execute stored programs that are generally stored for execution within a memory 220. The processor 210 can be any processor or a group of processors, for example an Intel Pentium-4® CPU or the like. The memory 220 is connected to the processor and can be any memory suitable for connection with the selected processor 210, such as SRAM, DRAM, SDRAM, RDRAM, DDR, DDR-2, etc. Firmware is stored in firmware storage 225 that is connected to the processor 210 and may include initialization software known as BIOS. This initialization software usually operates when power is applied to the system or when the system is reset. In some embodiments, the software is read and executed directly from the firmware storage 225. Alternately, the initialization software is copied into the memory 220 and executed from the memory 220 to improve performance.

Also connected to the processor 210 is a system bus 230 for connecting to peripheral subsystems such as a network interface 280, a hard disk 240, a CDROM 250, a graphics adapter 260 and a keyboard/mouse 270. The graphics adapter 260 receives commands and display information from the system bus 230 and generates a display image that is displayed on the display 265.

In general, the hard disk 240 may be used to store programs, executable code and data persistently, while the CDROM 250 may be used to load said programs, executable code and data from removable media onto the hard disk 240. These peripherals are meant to be examples of input/output devices, persistent storage and removable media storage. Other examples of persistent storage include core memory, FRAM, flash memory, etc. Other examples of removable media storage include CDRW, DVD, DVD writeable, compact flash, other removable flash media, floppy disk, ZIP®, laser disk, etc. In some embodiments, other devices are connected to the system through the system bus 230 or with other input-output connections. Examples of these devices include printers; mice; graphics tablets; joysticks; and communications adapters such as modems and Ethernet adapters.

The network interface 280 connects the computer-based system to the world-wide-web 10 through a link 285 which is, preferably, a high speed link such as a cable broadband connection, a Digital Subscriber Loop (DSL) broadband connection, a T1 line or a T3 line.

FIG. 6a shows a set of servers 290, each having access to the searchable job posting database 22. In this example, job bots 20 can be run in parallel on each server 290, accessing the job post hosting sites through, in this example, a serial T1 line operating at 1.44 Mbps providing access to the world-wide-web (www). Although T1, T3 and Cable connections are shown, any broadband connection works equally as well including dial-up, fiber, cable, DSL, T1 and T3.

Referring to FIG. 7a-d, examples of job postings 170/180/190/200 of all embodiments of the present invention are shown. In these examples, key information in the job posts are found relating to the Searchable Job Post Fields in Table-1:
1. jobtitle follows "Job Title:"
2. jobdesc follows "RESPONSIBILITIES:" and ends just before "EDUCATIONAL REQUIREMENTS".
3. company follows "Company:" and ends just before "Click here"

In the first job posting 170, there is a location of the job (Tampa, Fla.) 172, the job title (accountant) 173, a job requisition number (00073-044444) 174 and company 175. Following that is a description of the job responsibilities, educational requirements and candidate profile. When this job posting is processed, the job title "tax preparer" is found in the job title 173 and "H&R Block" found in the company 175 and the O*NET® code of 13-2082.00 is assigned when these match the third entry of Table-3.

Figure 7A:
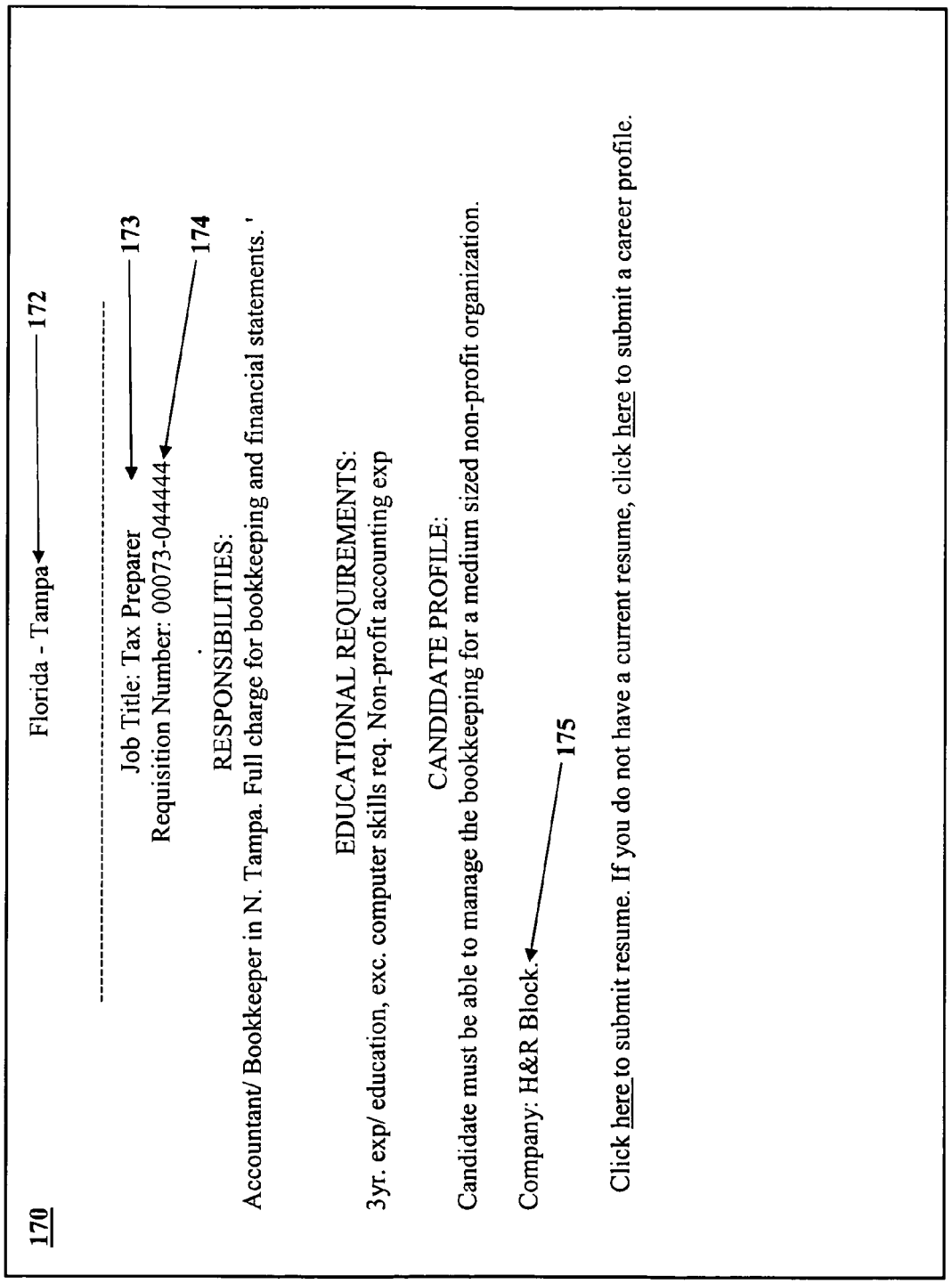
FIG. 7a illustrates an example of a job posting of all embodiments of the present invention.
Figure 7B:
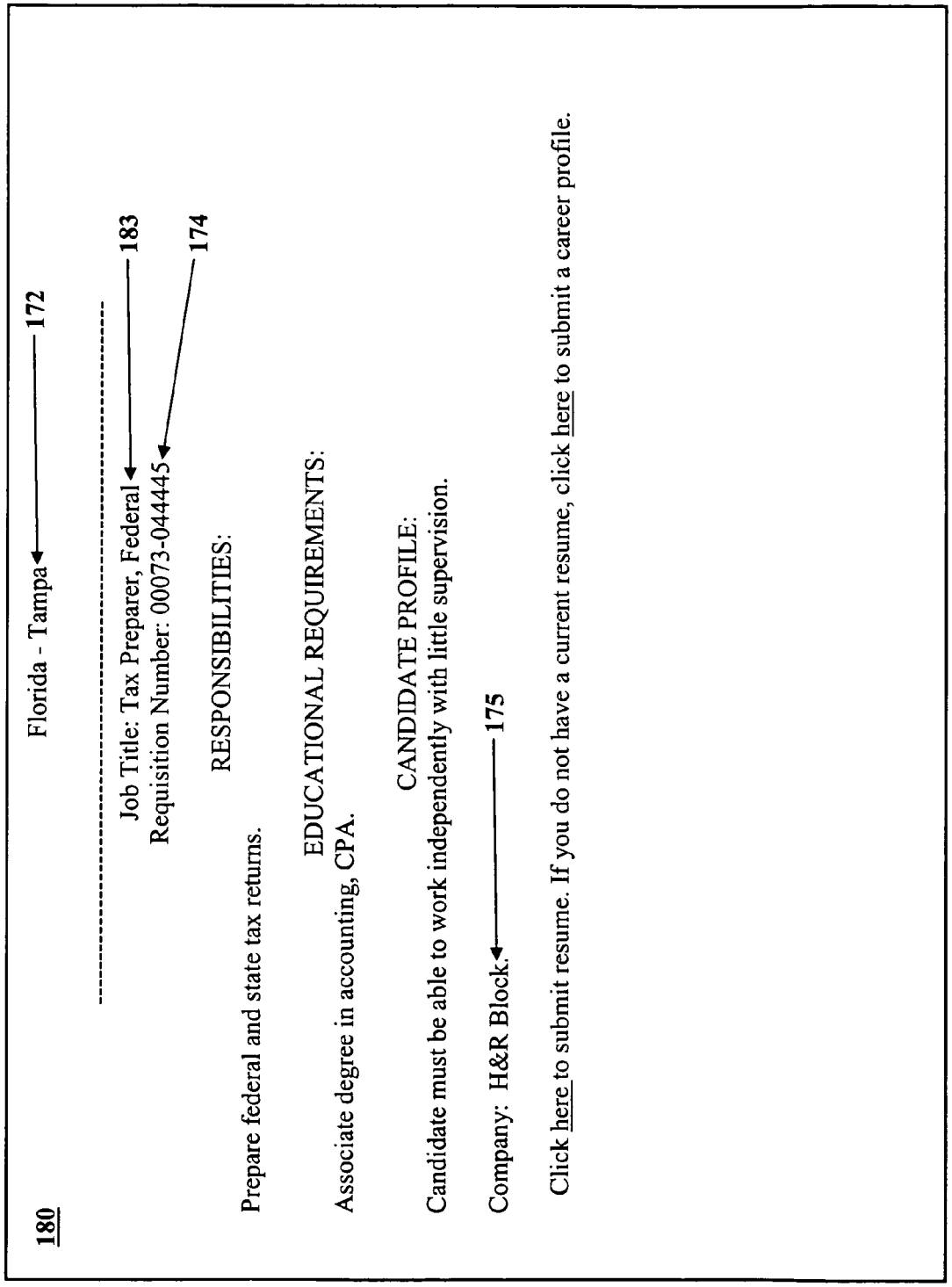
FIG. 7b illustrates a second example of a job posting of all embodiments of the present invention.

Referring to the job description of FIG. 7b, the job title 183 of "Tax Preparer, Federal" is not found in Table-3. If the job title was "Tax Preparer," it would have been found. When step 70 is performed and Table 3 is consulted to correlate the prefix of job title 183 with the job title of "tax preparer," the third entry is found and the O*NET® code of 13-2082.00 is assigned.

Figure 7C:
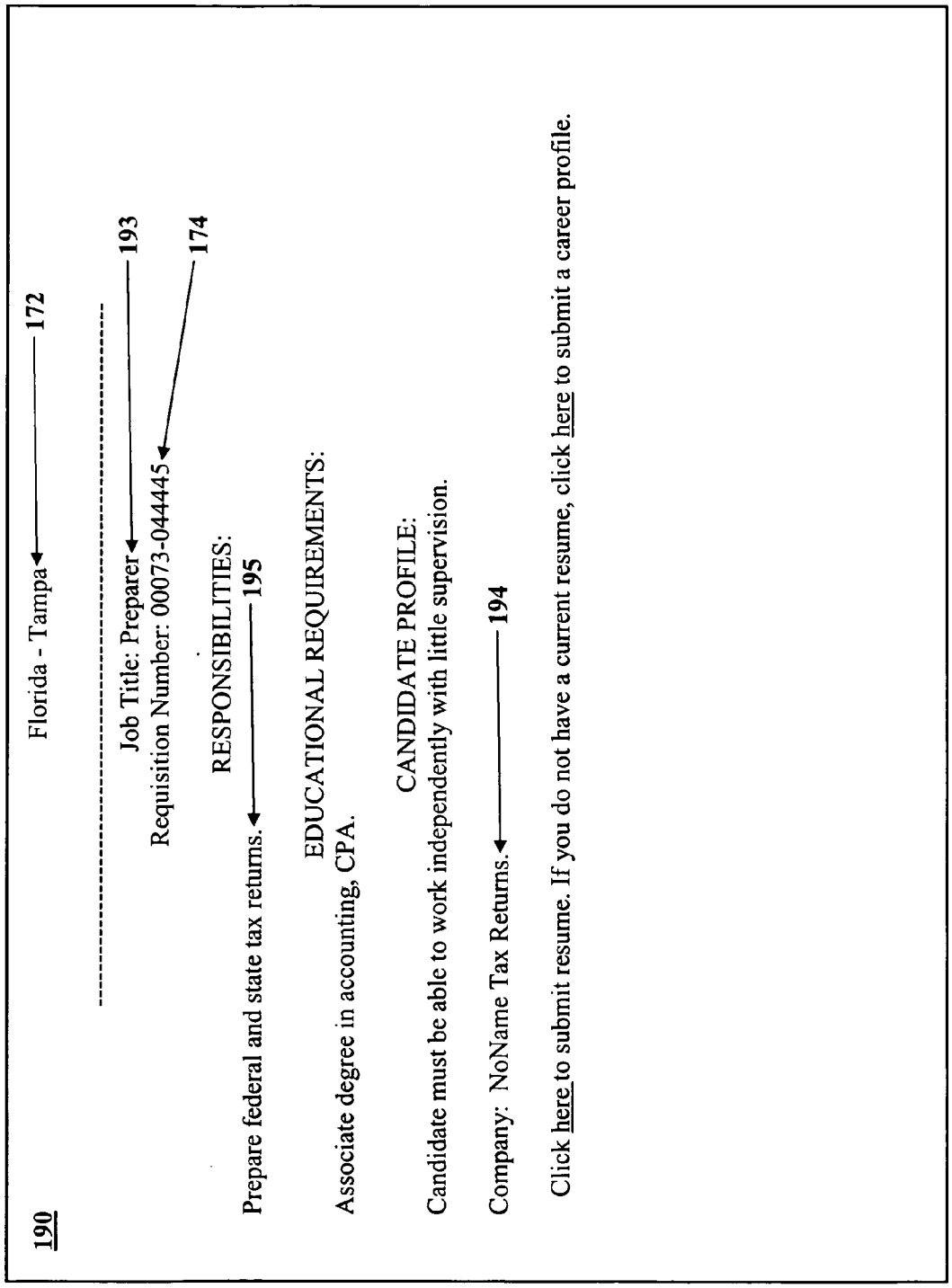
FIG. 7c illustrates a third example of a job posting of all embodiments of the present invention.

Referring to the job description of FIG. 7c, the job title 193 of "Preparer" is not found in Table-3, nor is "NoName Tax Returns" 194. If the title was "Tax Preparer" and company was "H&R Block," it would have been found, but it is not known what type of preparer is being referenced (e.g., the posting can be for a food preparer, etc.). No steps up until step 94 find a job title of "preparer," so all the known titles are relevance-searched for the closest job title to "preparer". Several job titles are found, including "preparer" and "food preparation," and the O*NET® code of the closest in relevancy is assigned (e.g., 13-2082.00).

Figure 7D:
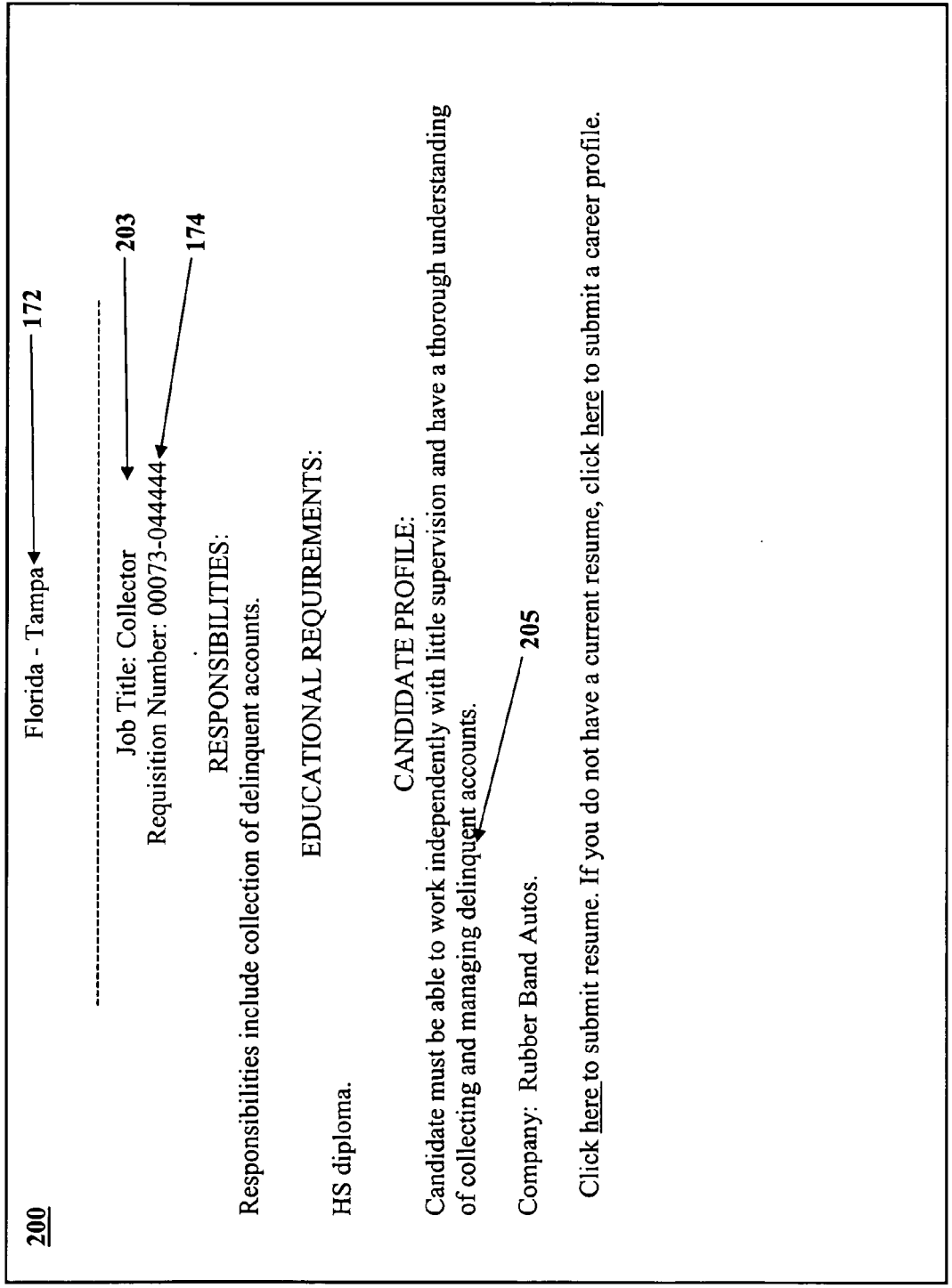
FIG. 7d illustrates a fourth example of a job posting of all embodiments of the present invention.

Referring to the job description of FIG. 7d, the job title 193 of "Collector" 203 is not found in steps 40-50. If the title was "Tax Preparer" and the company was "H&R Block," it would have been found in step 42, but it is not. In step 52, the job title "Collector" 203 and job description keywords are searched in a table like Table-4, finding "delinquent" 204. This correlates to the second entry in Table-4 and an O*NET® code of 43-0011.0 is assigned.

Figure 8:
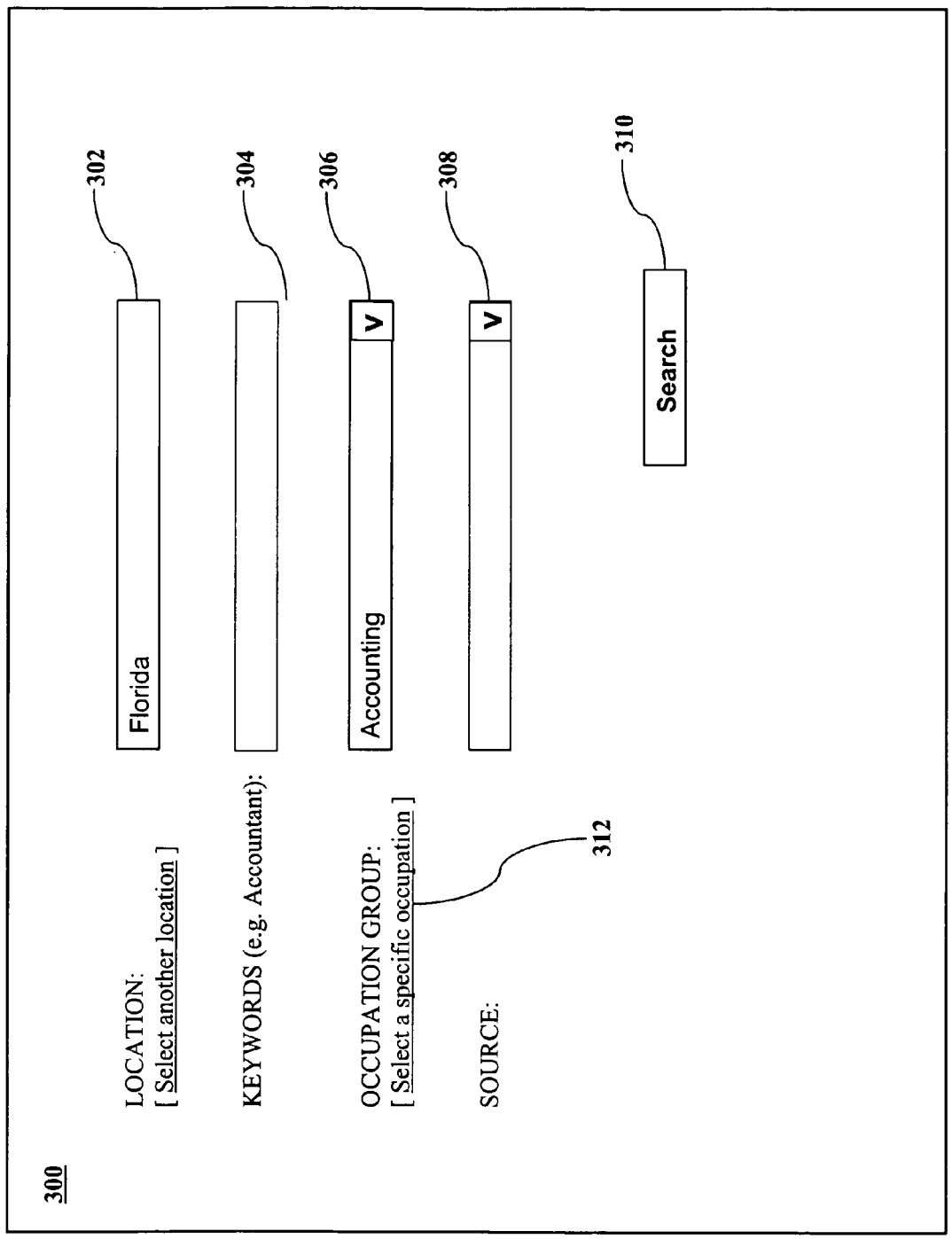
FIG. 8 illustrates an example of a top-level job search web page of all embodiments of the present invention.

Referring to FIG. 8, an example of a top-level job search web page 300 of all embodiments of the present invention is shown. In general, a job seeker is trying to find a job in a specific location, such as "Florida" as shown in the location field 302. If the job seeker is very flexible, the location field 302 can by set to "Any Location" or if they are less flexible, it can be set to a state (e.g., Florida) or a more specific geographic area such as a county (e.g., Pinellas) or a city (e.g., Tampa). The job seeker can specify keywords that can appear in the title, job description or other fields of the job posts by entering the keywords in the keyword field 304. For example, a programmer can enter keywords of "assembly language" or "C++," relating to specific skills they posses. If the keyword field 302 is left blank, then all positions matching the other fields will be presented. The source field 308 allows the job seeker to restrict the search to a specific source of jobs such as "government" or "Corporate." In some embodiments, this field is a "pull-down" field (e.g., pre-selected choices) and some sample values for this field include: Preferred Employer, America's JobBank, Corporate, Education Institution, Government, Hospitals, Newspaper, Private Job Board and Recruiter.

The occupation group field 306 has two modes of operation. If the job seeker is interested in a very broad occupational group, they can select a category from the pull down list that is broad, such as "Production Operations" or "Legal Occupations." An example of occupational categories includes: Any Group, Architecture and Engineering Occupations, Arts, Design, Entertainment, Sports, and Media Occupation, Building and Grounds Cleaning and Maintenance Occupation, Business and Financial Operations Occupations, Community and Social Services Occupations, Computer and Mathematical Occupations, Construction and Extraction Occupations, Education, Training, and Library Occupations, Farming, Fishing, and Forestry Occupations, Food Preparation and Serving Related Occupations, Healthcare Practitioners and Technical Occupations, Healthcare Support Occupations, Installation, Maintenance, and Repair Occupations, Legal Occupations, Life, Physical, and Social Science Occupations, Management Occupations, Military Specific Occupations, Office and Administrative Support Occupations, Personal Care and Service Occupations, Production Occupations, Protective Service Occupations, Sales and Related Occupation, Transportation and Material Moving Occupations, and Unclassified Occupations. Each occupation category corresponds to an O*NET code and that O*NET code is used as a search O*NET code to search the searchable job postings database for matching job postings.

Figure 9:
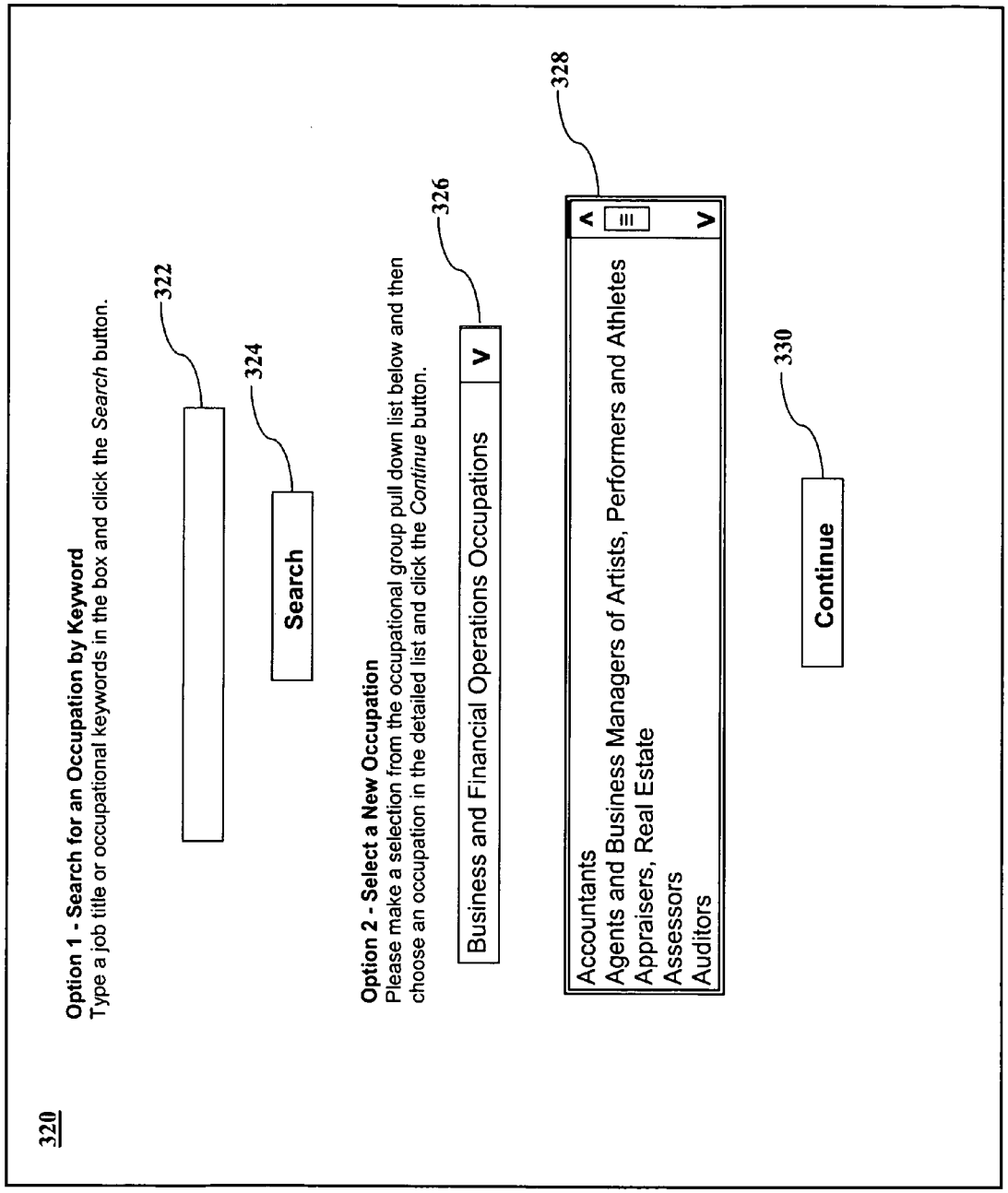
FIG. 9 illustrates an example of a second-level job search web page of all embodiments of the present invention.
Figure 10:
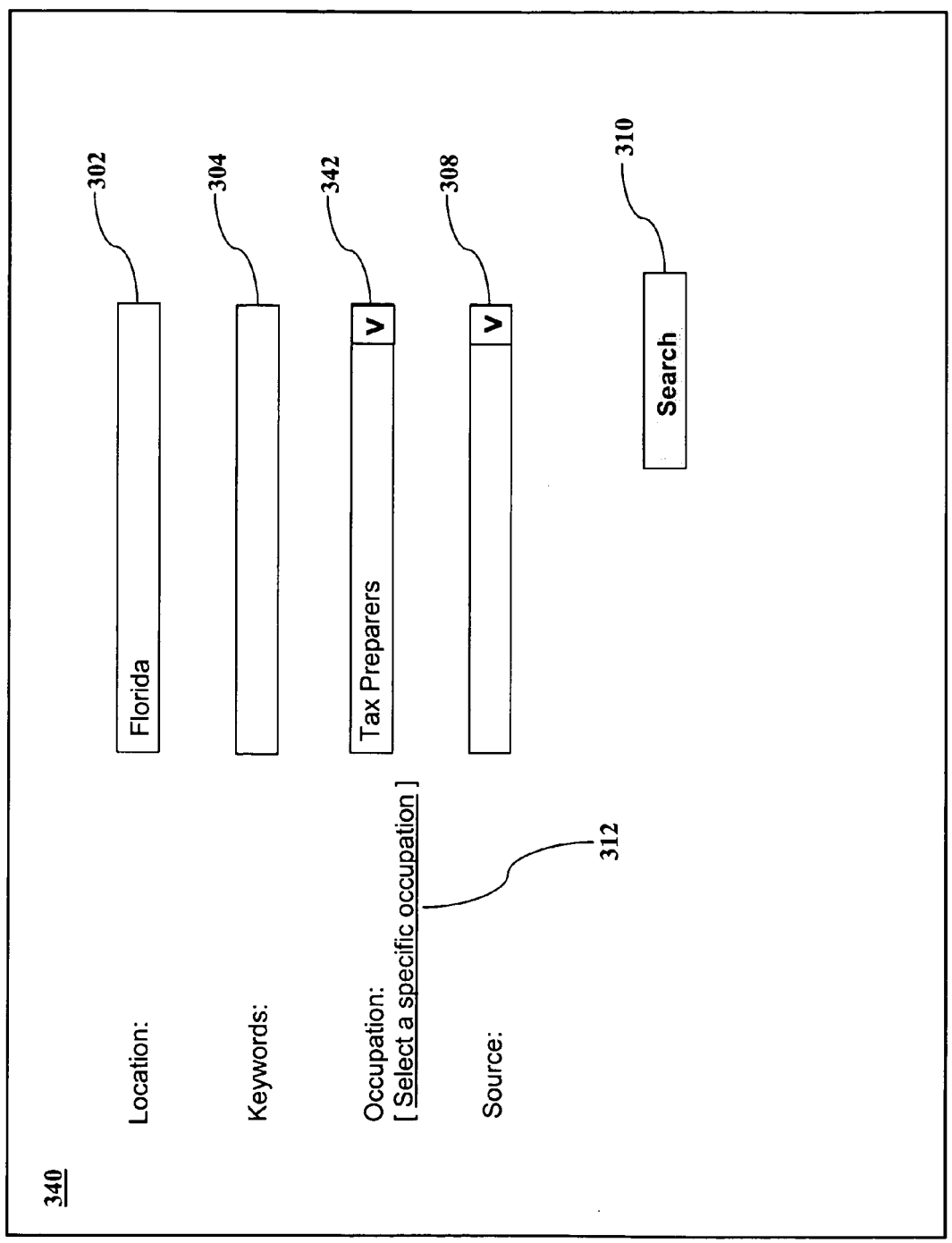
FIG. 10 illustrates an example of an updated top-level job search web page of all embodiments of the present invention.

If the job seeker wants a much narrower occupation group 306, the job-seeker can select (click on) "Select a specific occupation" 312 and narrow the occupation group to a more specific set of occupations or a single occupation. FIGS. 9 and 10 provide an example of how the job seeker can narrow the occupation group. Once the desired criteria are established, the job seeker selects (clicks on) the search button 310 and the job postings database 22 is searched for all job postings that match the desired criteria and those job postings are presented to the job seeker.

Referring to FIGS. 9 and 10, examples of second-level job search web pages 320/340 of all embodiments of the present invention is shown. In this example, the job seeker has two ways to narrow the occupational group. In the first option, an occupational keyword 322 is accepted from the job seeker then the job seeker selects search 324 and the keyword is used to find a list of possible occupations that relate to the keyword. For example, if the keyword "Preparer" is searched, a list of occupations relating to "Preparer" is returned along with a score indicating how close the occupation is to the keyword. In this case, "Medical Equipment Preparers," "Tax Preparers," "Chemical Equipment Tenders," etc are returned. If the job seeker sees a desired occupation in the list, the job seeker clicks on the occupation title and it is copied back into the occupation group field 342 (see FIG. 10).

In the second option, an occupational group 326 is selected by the job seeker using scrolling and selecting in the occupation group list 326. The job seeker is then presented with a refined list of narrow occupations in the occupations box 328, through which they can scroll and select a narrow occupation. For example, if "Business and Financial Operations" is selected in the occupation group list 326, the occupations box 328 is populated with "Accountants,""Appraisers," "Assessors," etc. In this case, the job seeker can scroll down and find "Tax Preparers," and by highlighting "Tax Preparers" (by clicking on that line) then selecting "Continue" 330 (by clicking), the occupation title is copied back into the occupation group field 342 (see FIG. 10).

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method for determining ONET codes, the method comprising the steps of:
   providing a job spider, the job spider periodically visiting a job post hosting site;
   extracting various fields of a job posting automatically from the job post hosting site using the job spider;
   invoking an ONET code generator, the ONET code generator analyzing the extracted fields of the job posting;
   looking up at least two of the extracted fields of the job posting in translation tables using the ONET code generator;
   determining an ONET code from the at least two of the extracted fields of the job posting using the ONET code generator, the ONET code generator using a hierarchical job categorization code; and
   if the ONET code is found, the ONET code generator assigning the ONET code to the job posting, the ONET code generator storing the ONET code and the job posting in a searchable job posting database.

2. The method according to claim 1, further comprising the step of:
   if the ONET code is not found, the ONET code generator storing an invalid ONET code and the job posting in the searchable job posting database.

3. The method according to claim 1, wherein the translation tables include at least one table selected from the group consisting of a job title and employer table, a job title and keyword table, a GSI job title table, a lay job title table, a summary lay job title table and a non-GSI job title table.

4. The method according to claim 3, wherein the translation tables are stored in a database.

5. The method according to claim 1, further comprising the step of: if the ONET code is not found, the ONET code generator generating at least one relevant ONET code, and the ONET code generator storing the relevant ONET code and the job posting in the searchable job posting database.

6. The method according to claim 1, wherein the step of looking up requires an exact match of the field to an entry in the translation table.

7. The method according to claim 1, wherein the step of looking up requires a prefix match of the field to an entry in the translation table.

8. The method according to claim 1, wherein the step of looking up requires a word in the field to match an entry in the translation table.

9. The method according to claim 1, wherein the step of looking up requires the field to be relevant to an entry in the translation table.

10. A system for determining ONET codes, the system comprising:
    a computer connected to a network;
    a storage device operationally interfaced to the computer;
    a searchable job posting database stored within the storage device; and
    a plurality of job bots executing on the computer, each of the plurality of job bots visiting an assigned job post hosting site through the network, each job bot automatically extracting job post fields from a job post on the assigned job post hosting site;
    an ONET code generator operationally interfaced to the plurality of job bots, the ONET code generator analyzing the extracted job post fields, the ONET code generator assigning an ONET code to the job posting, the ONET code generator storing the extracted job post fields and the assigned ONET code in the searchable job posting database, the ONET code being determined by the ONET code generator by searching for at least two of the extracted job post fields in translation tables.

11. The system of claim 10, wherein the network is a world-wide-web.

12. The system of claim 10, further comprising a search engine executing on the computer, the search engine accepting a job title that corresponds to a search ONET code and using the search ONET code to find stored job posts in the searchable job posting database using the search ONET code.

13. The system according to claim 10, wherein the translation tables include at least one table selected from the group consisting of a job title and employer table, a job title and keyword table, a GSI job title table, a lay job title table, a summary lay job title table and a non-GSI job title table.

14. The system according to claim 13, wherein the lookup tables are stored in a database.

15. The system according to claim 10, wherein the ONET code is determined by an exact match of two of the job post fields to an entry in the translation table.

16. The system according to claim 10, wherein the ONET code is determined by a prefix match of two of the job post fields to an entry in the translation table.

17. The system according to claim 10, wherein the ONET code is determined by a word in two of the job post fields matching an entry in the translation table.

18. The system according to claim 10, wherein the ONET code is determined by two or more of the job post fields being relevant to an entry in the translation table.

19. A computer readable medium including computer programming instructions that cause a computer to perform the method for determining ONET codes, the method comprising the steps of:
    providing a job spider, the job spider periodically visiting a job post hosting site;
    extracting various fields of a job posting automatically from the job post hosting site using the job spider;
    invoking an ONET code generator within the job spider, the ONET code generator analyzing the extracted fields of the job posting;
    translating at least two of the fields to an ONET code using translation tables using the ONET code generator; and
    if the ONET code is found, the ONET code generator assigning the ONET code to the job posting, the ONET code generator storing the ONET code along with the job posting in a searchable job posting database.

20. The computer readable medium including the computer programming instructions that cause the computer to perform the method for determining ONET codes according to claim 19, further comprising the step of:

if the associated ONET code is not found, the ONET code generator storing an invalid ONET code along with the job posting in the searchable job posting database.

21. The computer readable medium including the computer programming instructions that cause the computer to perform the method for determining ONET codes according to claim 19, wherein the translation tables include at least one table selected from a job title and employer table, a job title and keyword table, a GSI job title table, a lay job title table, a summary lay job title table and a non GSI job title table.

22. The computer readable medium including the computer programming instructions that cause the computer to perform the method for determining ONET codes according to claim 21, wherein the translation tables are stored in a database.

23. The method according to claim 19, further comprising the step of: if the ONET code is not found, the ONET code generator generating a relevant ONET code and storing the relevant ONET code and the job posting in the searchable job posting database.

24. The computer readable medium including the computer programming instructions that cause the computer to perform the method for determining ONET codes according to claim 19, wherein the step of looking up requires an exact match of the at least two fields to an entry in the translation table.

25. The computer readable medium including the computer programming instructions that cause the computer to perform the method for determining ONET codes according to claim 19, wherein the step of looking up requires a prefix match of the at least two fields to an entry in the translation table.

26. The computer readable medium including the computer programming instructions that cause the computer to perform the method for determining ONET codes according to claim 19, wherein the step of looking up requires a word in the at least two fields to match an entry in the translation table.

27. The computer readable medium including the computer programming instructions that cause the computer to perform the method for determining ONET codes according to claim 19, wherein the step of looking up requires the at least two fields to be relevant to an entry in the translation table.

28. A computer program product stored in a computer memory of a computer system for determining ONET codes, the computer program product comprising:
    a computer usable medium having computer-readable code means embodied in the medium, the computer-readable code means comprising:
    a plurality of computer readable code means for providing a job spider, the job spider periodically visiting a job post hosting site;
    a plurality of computer readable code means for automatically extracting various fields of a job posting from the job post hosting site using the job spider;
    a plurality of computer readable code means for invoking an ONET code generator, the ONET code generator analyzing the extracted fields of the job posting;
    a plurality of computer readable code means using the ONET code generator for translating at least two of the fields into an ONET code; and
    a plurality of computer readable code means using the ONET code generator for determining if the at least one field was translated and if so, using the ONET code generator for assigning the ONET code and storing the ONET code along with the job posting in a searchable job posting database.

29. The computer program product stored in the computer memory of the computer system for determining ONET codes according to claim 28, wherein the plurality of computer readable code means for translating uses at least one table selected from a job title and employer table, a job title and keyword table, a GSI job title table, a lay job title table, a summary lay job title table and a non-GSI job title table.

30. A system for finding a job using ONET codes, the system comprising:
    a computer connected to a network;
    a storage device operationally interfaced to the computer;
    a searchable job posting database stored within the storage device;
    a plurality of job bots executing on the computer, each of the plurality of job bots visiting an assigned job post hosting site through the network, each job bot automatically extracting job post fields from a job post on the assigned job post hosting site;
    an ONET code generator operationally interfaced to the plurality of job bots, the ONET code generator analyzing the extracted job post fields, the ONET code generator assigning an ONET code to the job post, the ONET code generator storing the extracted job post fields and the assigned ONET code in the searchable job posting database, the ONET code being determined by the ONET code generator by searching for at least two of the extracted job post fields in translation tables; and
    a search engine executing on the computer, the search engine accepting a job title that corresponds to a search ONET code and using the search ONET code to find stored job posts in the searchable job posting database.

31. The system of claim 30, wherein the job title is selected from the group consisting of Architecture and Engineering Occupations; Arts; Design; Entertainment;
    Sports, and Media Occupation; Building and Grounds Cleaning and Maintenance Occupation; Business and Financial Operations Occupations; Community and Social Services Occupations; Computer and Mathematical Occupations; Construction and Extraction Occupations; Education; Training; and Library Occupations; Farming; Fishing;
    and Forestry Occupations; Food Preparation and Serving Related Occupations; Healthcare Practitioners and Technical Occupations; Healthcare Support Occupations; Installation;
    Maintenance; and Repair Occupations; Legal Occupations; Life; Physical; and Social Science Occupations; Management Occupations; Military Specific Occupations; Office and Administrative Support Occupations; Personal Care and Service Occupations; Production Occupations; Protective Service Occupations; Sales and Related Occupation; and Transportation and Material Moving Occupations.

* * * * *